(12) United States Patent
Chen

(10) Patent No.: US 6,912,755 B2
(45) Date of Patent: Jul. 5, 2005

(54) CLAMPING DEVICE OF A ROTATING TOOL

(76) Inventor: Lung-Hui Chen, No. 296-1, Jungshan Rd., Jubei City, Hsinchu (TW)

( * ) Notice: Subject to any disclaimer, the term of this patent is extended or adjusted under 35 U.S.C. 154(b) by 67 days.

(21) Appl. No.: 10/671,551

(22) Filed: Sep. 29, 2003

(65) Prior Publication Data

US 2005/0069393 A1 Mar. 31, 2005

(51) Int. Cl.[7] ............................................... A46B 3/08
(52) U.S. Cl. ..................... 15/179; 451/469; 403/340; 403/341; 403/408.1
(58) Field of Search .............. 15/179; 403/339–341, 403/329, 408.1; 451/465–466, 469; 83/698.41, 83/665–666, 481; 409/232, 234; 408/239 R; 407/51–52

(56) References Cited

U.S. PATENT DOCUMENTS

| | | | | |
|---|---|---|---|---|
| 1,497,974 A | * | 6/1924 | Cornell | 15/179 |
| 1,714,700 A | * | 5/1929 | Stull | 407/52 |
| 2,309,553 A | * | 1/1943 | Twyning et al. | 15/179 |
| 3,200,543 A | * | 8/1965 | O'Neil, Jr. et al. | 451/469 |
| 3,481,017 A | * | 12/1969 | Hunt | 15/179 |
| 4,365,448 A | * | 12/1982 | Wilson | 451/466 |
| 4,455,788 A | * | 6/1984 | Freerks | 451/466 |
| 5,090,845 A | * | 2/1992 | Bentjens | 407/52 |
| 5,177,830 A | * | 1/1993 | Montabaur et al. | 15/179 |
| 5,323,505 A | * | 6/1994 | Montabaur et al. | 15/179 |
| 5,386,608 A | * | 2/1995 | Montabaur et al. | 15/179 |
| 5,477,845 A | * | 12/1995 | Zuzelo | 83/666 |
| 6,065,898 A | * | 5/2000 | Hale | 403/340 |

* cited by examiner

Primary Examiner—Erica Cadugan
(74) Attorney, Agent, or Firm—Birch, Stewart, Kolasch & Birch LLP

(57) ABSTRACT

A clamping device of a rotating tool includes a first clamping plate and a second clamping plate. The first clamping plate includes a snap groove disposed at the center of the first clamping plate and having a bored hole disposed at a center of the snap groove and a plurality of first fixing grooves disposed on the circumference of the first clamping plate. The second clamping plate includes a snap protrusion disposed at the center of the second clamping plate, corresponding to the snap groove, and having a bored hole disposed at a center of the snap protrusion, and a plurality of fixing protrusions disposed on the circumference of the second clamping plate and corresponding to the first fixing grooves, wherein one of the first and second clamping plates includes a plurality of union protrusions integrally formed thereon and the other one includes a plurality of second fixing grooves corresponding to the union protrusions.

10 Claims, 5 Drawing Sheets

CLAMPING DEVICE OF A ROTATING TOOL

FIELD OF THE INVENTION

The present invention relates to a clamping device and particularly to a clamping device of a rotating tool including a clamping plate and a plurality of union protrusions which are integrally fixed thereon.

BACKGROUND OF THE INVENTION

Conventional clamping device is mainly applied in a rotating tool. The component (such as a tool) which is required to be rotated can take action until the component is female jointed to the clamping device. The clamping device is constituted by a first clamping plate 10, a second clamping plate 11 and a cylinder shaped union protrusion 102' with elastic material. The first and second clamping plates 10, 11 are respectively equipped with a first fixing groove 101 and a fixing protrusion 111, and respectively equipped with a bored hole 12 and a bored hole 12' which are respectively disposed at the center of the first and second clamping plates 10, 11. For example, a deckle edge removed tool (such as a steel brush 15), as shown in FIG. 1, is female jointed to the cylinder shaped union protrusion 102', then the cylinder shaped union protrusion 102' is disposed in the first clamping plate 10, and then the second clamping plate 11 and the first clamping plate 10 are jointed to each other by using the fixing protrusion 111. Finally, a fixing element 14 and an adapter 13 are respectively inserted into the ends of the first clamping plate 10 and the second clamping plate 11, so as to complete the combination of the clamping device with the deckle edge removed tool.

There are following problems according to the above-mentioned conventional clamping device with the rotating tool:

1. The cylinder shaped union protrusion and the champing plates are a combining type. For above reason, when the cylinder shaped union protrusion and the champing plates are combined with the steel brush, the steel brush is female jointed to the cylinder shaped union protrusion and then the cylinder shaped union protrusion is combined with clamping plates, so as to produce some unnecessary processes.

2. Conventional cylinder shaped union protrusion has the function which female joint the steel brush. When the cylinder shaped union protrusion with elastic material and the steel brush are in operation, the friction between the steel brush and a work piece will generate high heat because of rotation with high speed, so as to damage the cylinder shaped union protrusion.

Accordingly, there exists a need for a clamping device of a rotating tool to solve the above-mentioned problems and disadvantages.

SUMMARY OF THE INVENTION

The present invention provides a clamping device of a rotating tool including a clamping plate and a plurality of union protrusions which are integrally fixed thereon so as to easily fast complete the combination of the clamping device.

In order to achieve the foregoing objects, the present invention provides a clamping device of a rotating tool. The clamping device of the rotating tool includes a first clamping plate and a second clamping plate. The first clamping plate includes a snap groove disposed at the center of the first clamping plate and having a bored hole disposed at a center of the snap groove and a plurality of first fixing grooves disposed on the circumference of the first clamping plate. The second clamping plate includes a snap protrusion disposed at the center of the second clamping plate, corresponding to the snap groove, and having a bored hole disposed at a center of the snap protrusion, and a plurality of fixing protrusions disposed on the circumference of the second clamping plate and corresponding to the first fixing grooves, wherein one of the first and second clamping plates includes a plurality of union protrusions integrally formed thereon and the other one includes a plurality of second fixing grooves corresponding to the union protrusions.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
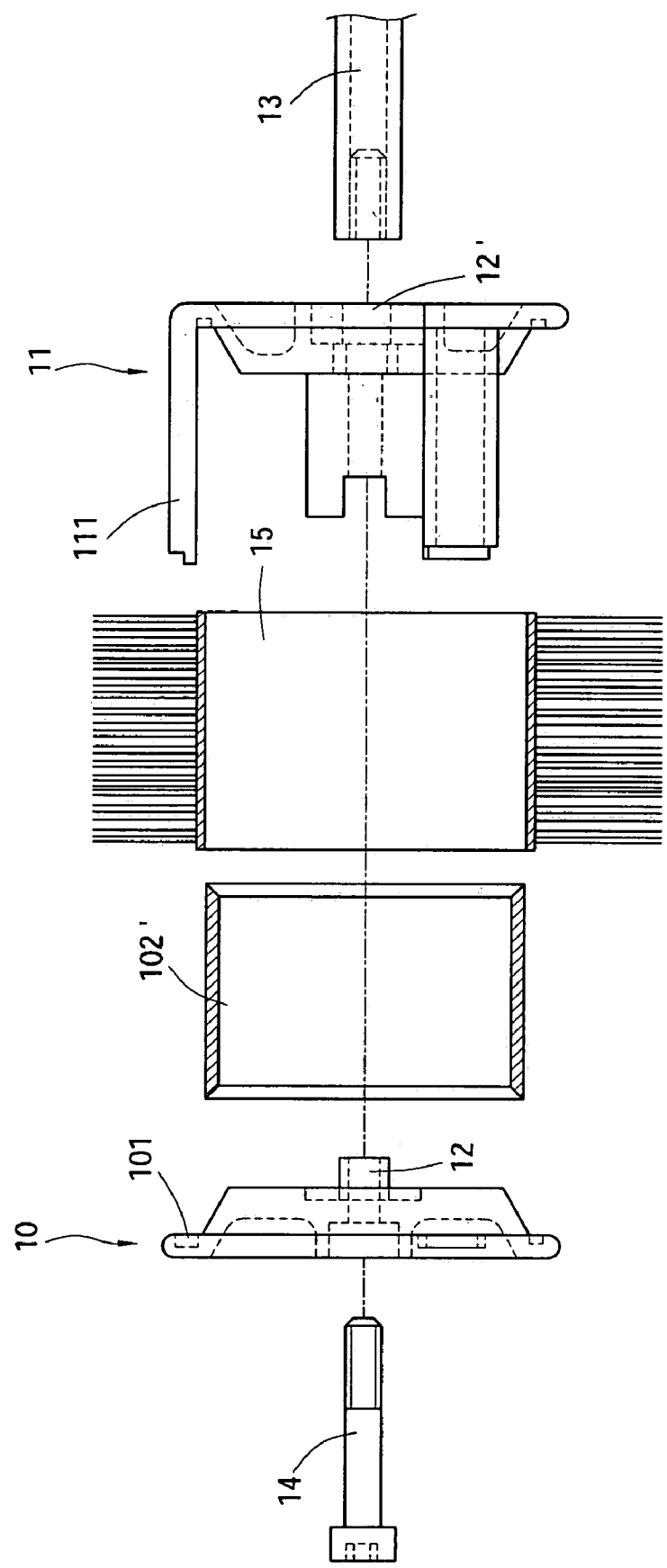
FIG. 1 is a sectional view of a clamping device in the prior art.
Figure 2:
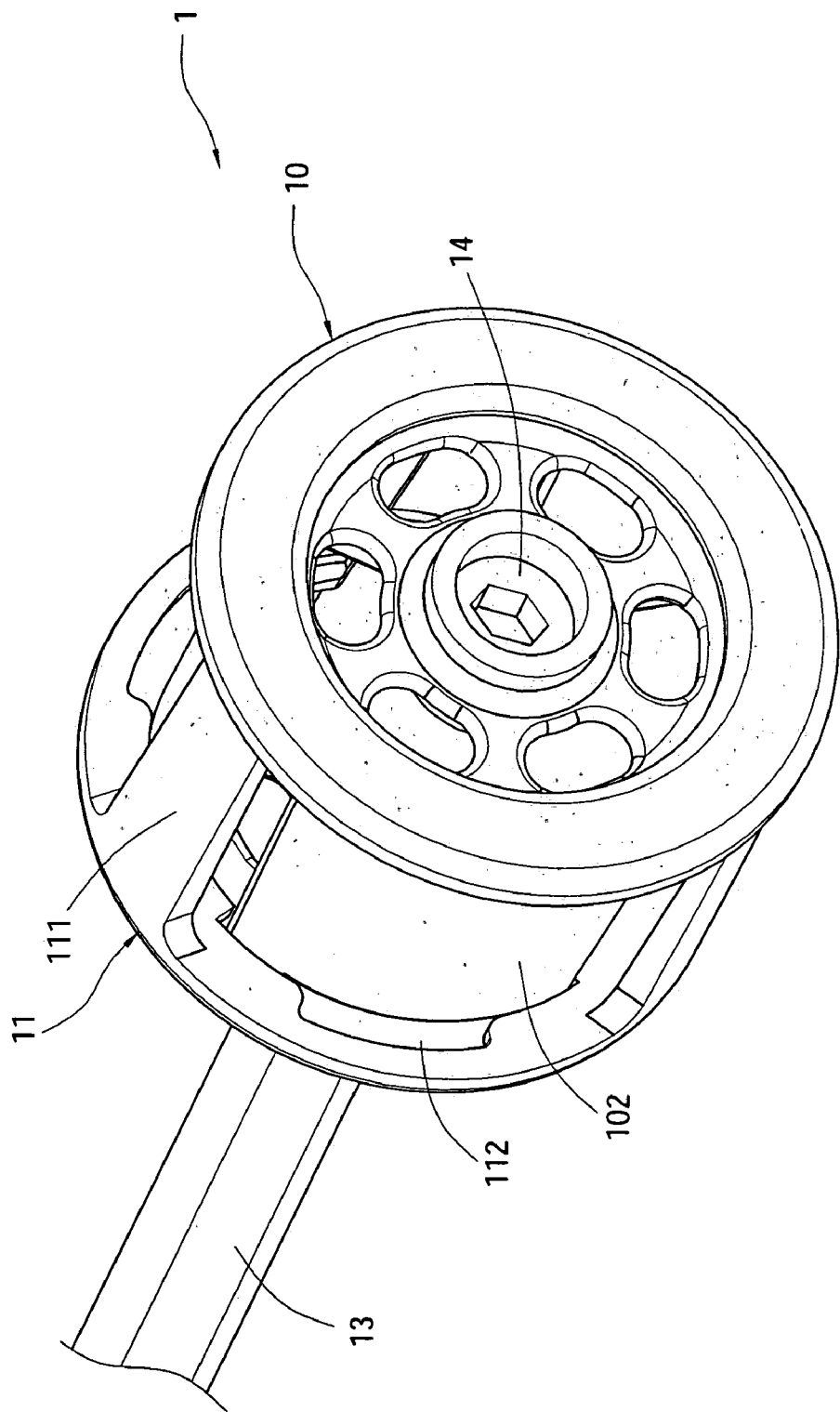
FIG. 2 is a perspective view of a clamping device according to an embodiment of the present invention.
Figure 3:
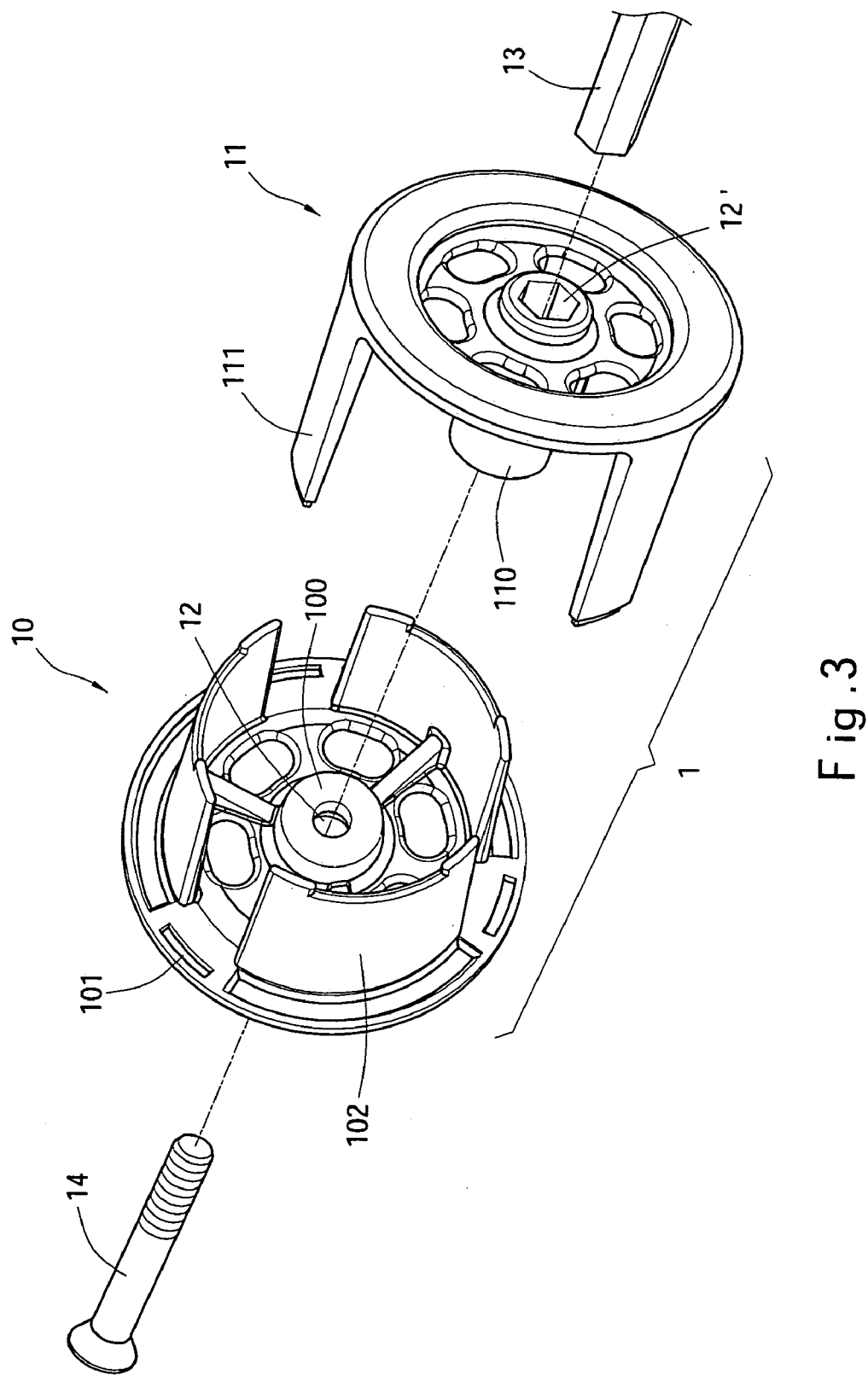
FIG. 3 is an exploded perspective view of a clamping device according to an embodiment of the present invention.

Referring to FIGS. 2 and 3, the clamping device 1 comprises a first clamping plate 10 and a second clamping plate 11. The first clamping plate 10 is equipped with a snap groove 100 and a plurality of first fixing grooves 101, and the second clamping plate 11 is equipped with a snap protrusion 110 and a plurality of fixing protrusions 111. The shape of the snap groove 100 and the snap protrusion 110 are substantially circular or hexagonal. The fixing protrusion 111 and first fixing groove 101 can be a tenon and a groove corresponding to the tenon. The first clamping plate 10 and the second clamping plate 11 are jointed to each other by utilizing the snap groove 100, the snap protrusion 110, the first fixing grooves 101, and the fixing protrusions 111. Furthermore, the first clamping plate 10 and the second clamping plate 111 are respectively equipped with a bored hole 12 and a bored hole 12' which are respectively disposed at the center of the snap groove 100 and the snap protrusion 110. Then, the first clamping plate 10 and the second clamping plate 11 are fixed to each other by utilizing a fixing element 14 (such as a bolt or a tenon) and an adapter 13.

The snap groove 100 and snap protrusion 110 are respectively disposed at the center of the first clamping plate 10 and second clamping plate 11. The first fixing grooves 101 and fixing protrusions 111 are respectively disposed on the circumference of the first clamping plate 10 and second clamping plate 11, and the first fixing grooves 101 and the fixing protrusions 111 divide into equal parts on the circumference of the first clamping plate 10 and second clamping plate 11. The first clamping plate 10 is provided with a plurality of union protrusions 102, which are integrally fixed or formed thereon so as to easily fast complete the combination of the clamping device 1. The union protrusions 102 are a piece shaped structure and disposed on the circumference of the first clamping plate 10, and there is the same distance between the union protrusions 102. The union protrusion can be made of aluminum or aluminum alloy. The union protrusions 102 are snap jointed to the second clamping plate 11 by utilizing a plurality of second fixing grooves 112 which are disposed on the second clamping plate 11 and corresponding to the union protrusions 102.

Figure 4:
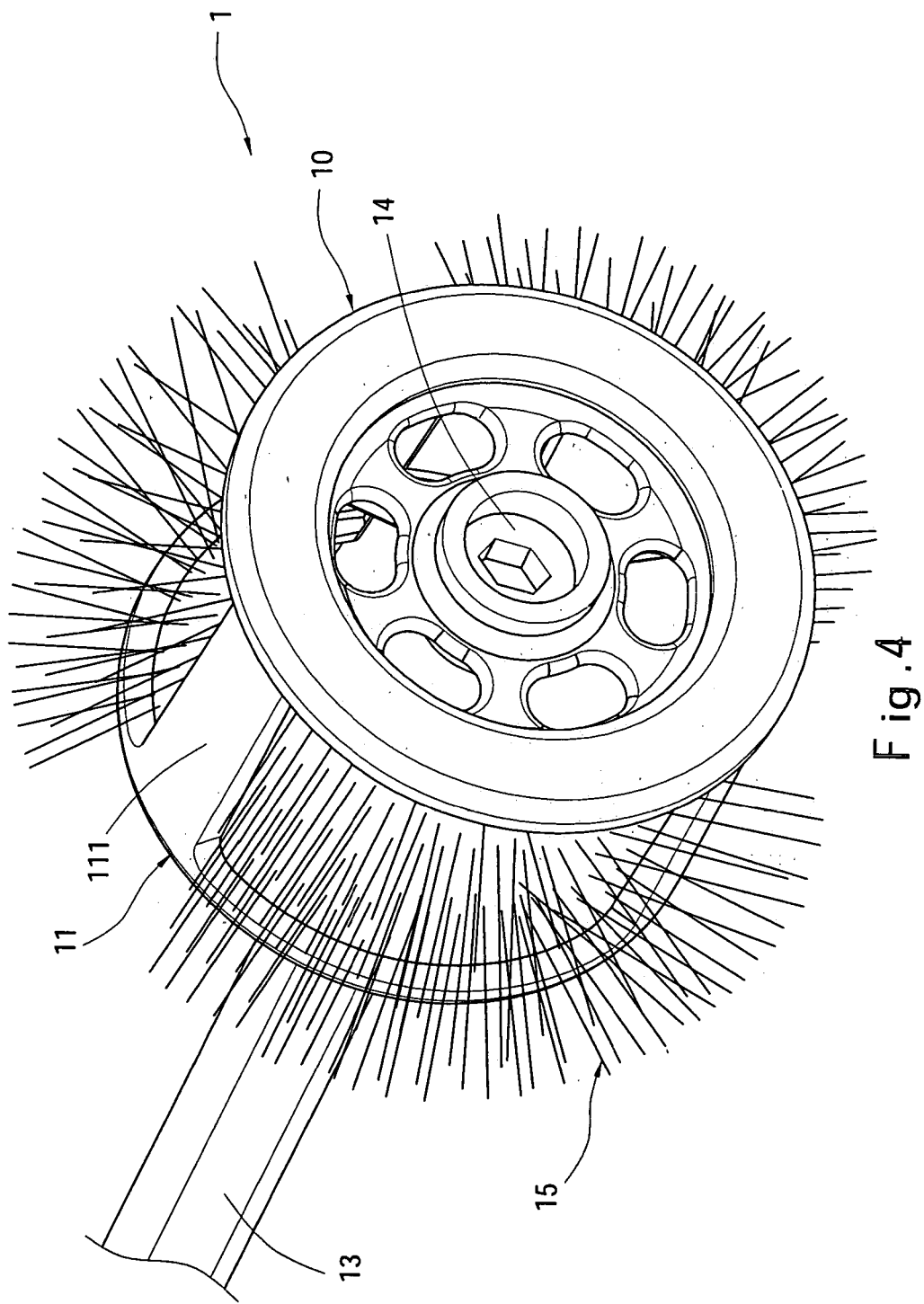
FIG. 4 is a perspective view of a clamping device with a steel brush according to an embodiment of the present invention.

Referring to FIG. 4, it depicts a clamping device 1 of a rotating tool, which is applied in a deckle edge removed tool. A steel brush 15 is female jointed to the union protrusion 102 of the first clamping plate 10. A plurality of gaps are disposed on the steel brush 15 and corresponding to the fixing protrusions 111 of the second clamping plate 11 for providing the fixing protrusions 111 of the second clamping plate 11 passed through the steel brush 15 and jointed to the first fixing grooves 101 of the first clamping plate 10. Then, the fixing element 14 and the adapter 13 are respectively inserted into the bored holes 12, 12' of the first and second clamping plates 10, 11, such that the clamping device 1 of the rotating tool with the steel brush 15 can be driven by the rotating tool in operation.

Figure 5:
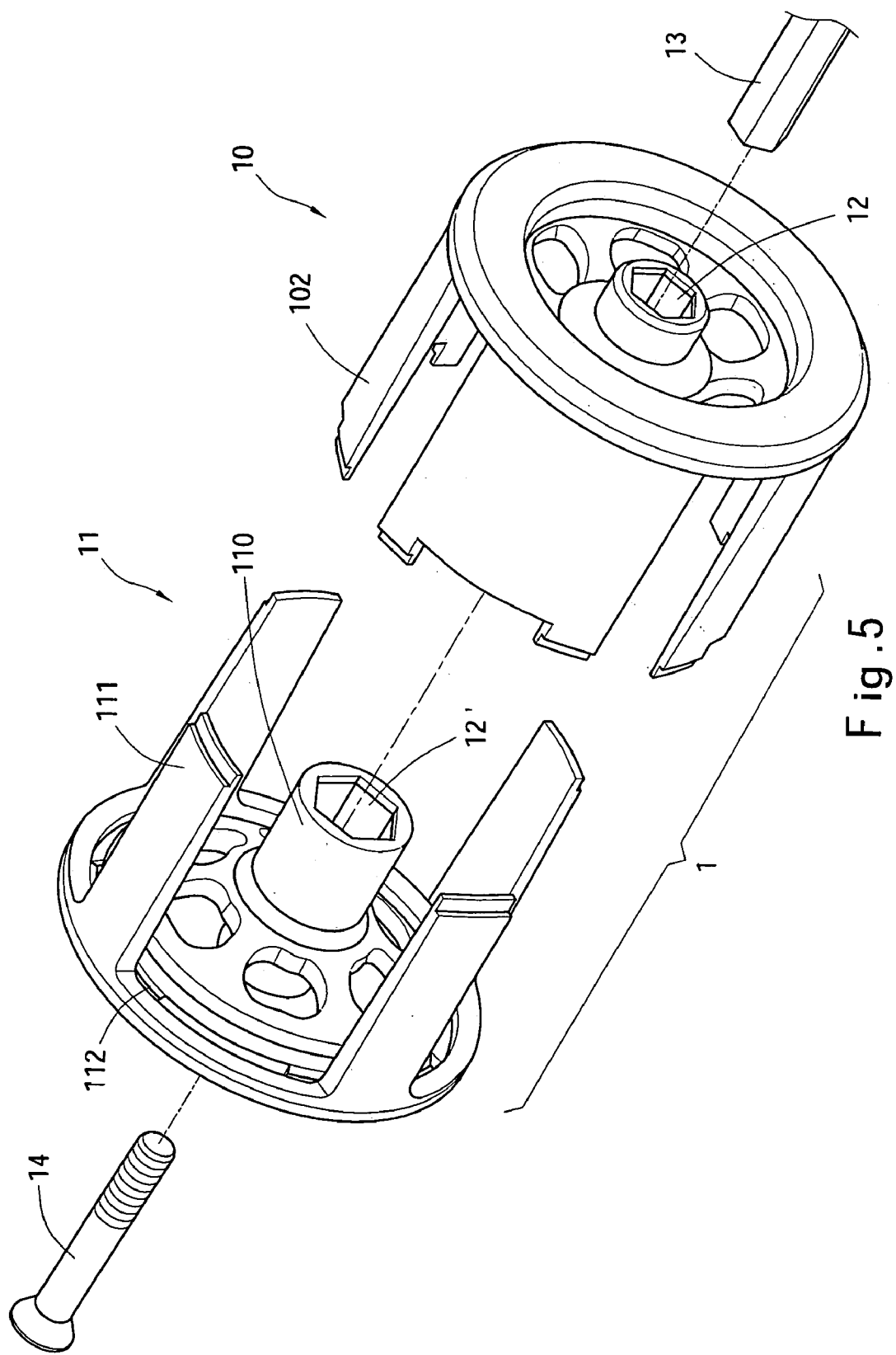
FIG. 5 is an exploded perspective view of a clamping device according to another embodiment of the present invention.

Referring to FIG. 5, it depicts the clamping device 1 of a rotating tool according to another embodiment of the present invention. The second clamping plate 11 is equipped with four fixing protrusions 111. The outer diameter of the circumference surrounded by the union protrusions 102 is longer than that of the first clamping plate 10, and the first fixing grooves 101 of the first clamping plate 10 are designed and corresponding to the fixing protrusion 111.

What is claimed is:

1. A clamping device of a rotating tool comprising:
    a first clamping plate including:
        a snap groove disposed at the center of said first clamping plate and having a bored hole disposed at a center of said snap groove; and
        a plurality of first fixing grooves disposed on a circumference of said first clamping plate; and
    a second clamping plate including:
        a snap protrusion disposed at the center of said second clamping plate, corresponding to said snap groove, and having a bored hole disposed at a center of said snap protrusion; and
        a plurality of fixing protrusions disposed on a circumference of said second clamping plate and corresponding to said first fixing grooves;
    wherein said first clamping plate includes a plurality of union protrusions integrally fixed thereon and the second clamping plate includes a plurality of second fixing grooves corresponding to said union protrusions.

2. The clamping device of a rotating tool according to claim 1, wherein one of said first and second clamping plates includes a fixing element for fixing said first clamping plate to said second clamping plate.

3. The clamping device of a rotating tool according to claim 2, wherein said fixing element is a bolt.

4. The clamping device of a rotating tool according to claim 2, wherein said fixing element is a tenon.

5. The clamping device of a rotating tool according to claim 1, wherein the shape of said snap protrusion and said snap groove are circular.

6. The clamping device of a rotating tool according to claim 1, wherein the shape of said snap protrusion and said snap groove are hexagonal.

7. The clamping device of a rotating tool according to claim 1, wherein each said fixing protrusion is a tenon and each first fixing groove is a groove corresponding to the respective tenon.

8. The clamping device of a rotating tool according to claim 1, wherein each said union protrusion can be made of aluminum.

9. The clamping device of a rotating tool according to claim 1, wherein each said union protrusion can be made of aluminum alloy.

10. The clamping device of a rotating tool according to claim 1, wherein said union protrusions are disposed on the circumference of said first clamping plate and there is the same distance between said union protrusions.

* * * * *